United States Patent [19]
Goo et al.

[11] Patent Number: 5,309,195
[45] Date of Patent: May 3, 1994

[54] AUTO POWER CUT-OFF DEVICE FOR CAMERA AND DRIVING METHOD THEREFOR

[75] Inventors: Bonjeong Goo; Byeongjun Moon, both of Kyeongsangnam, Rep. of Korea

[73] Assignee: Samsung Aerospace Industries, Inc., Kyeongsangnam, Rep. of Korea

[21] Appl. No.: 999,614

[22] Filed: Dec. 31, 1992

[30] Foreign Application Priority Data
Oct. 16, 1992 [KR] Rep. of Korea ............... 92-19074

[51] Int. Cl.$^5$ ............................................. G03B 7/26
[52] U.S. Cl. ................................................ 354/484
[58] Field of Search ...................................... 354/484

[56] References Cited

U.S. PATENT DOCUMENTS

| | | | |
|---|---|---|---|
| 4,250,413 | 2/1981 | Kawasaki et al. | 354/484 |
| 4,387,977 | 6/1983 | Uchidoi et al. | 354/484 |
| 4,429,974 | 2/1984 | Suzuki | 354/484 |
| 4,460,264 | 7/1984 | Winter | 354/484 |
| 4,553,140 | 11/1985 | Maida | 354/484 |
| 4,643,558 | 2/1987 | Hasegawa | 354/484 |
| 4,843,416 | 6/1989 | Brower | 354/484 |
| 4,914,469 | 4/1990 | Ishimura et al. | 354/484 |
| 5,032,864 | 7/1991 | Ishimura et al. | 354/484 |
| 5,150,147 | 9/1992 | Kobayshi et al. | 354/484 |

Primary Examiner—Russell E. Adams
Attorney, Agent, or Firm—Francis C. Hand

[57] ABSTRACT

An auto power cut-off device for camera and a driving method which can automatically close an automatic lens cap and concurrently cut-off power supplied to an auxiliary circuit in case that a user does not use a camera during a predetermined time after supplying the power to the camera. The auto power cut-off device is constituted by a switch block including a power control for staring the operation of the automatic camera, an encoder switch which can be varied according to the state of the automatic camera, and an operation switch for controlling the operation of the camera. The power cut-off device also has a micro controller of outputting a signal to block the power supplied to the auxiliary circuits in case that the automatic camera is not used during a predetermined period after operation of the automatic camera beings; and a power control means for blocking the power supplied to the auxiliary circuits in case that the power cut-off signal is inputted from the micro controller.

2 Claims, 2 Drawing Sheets

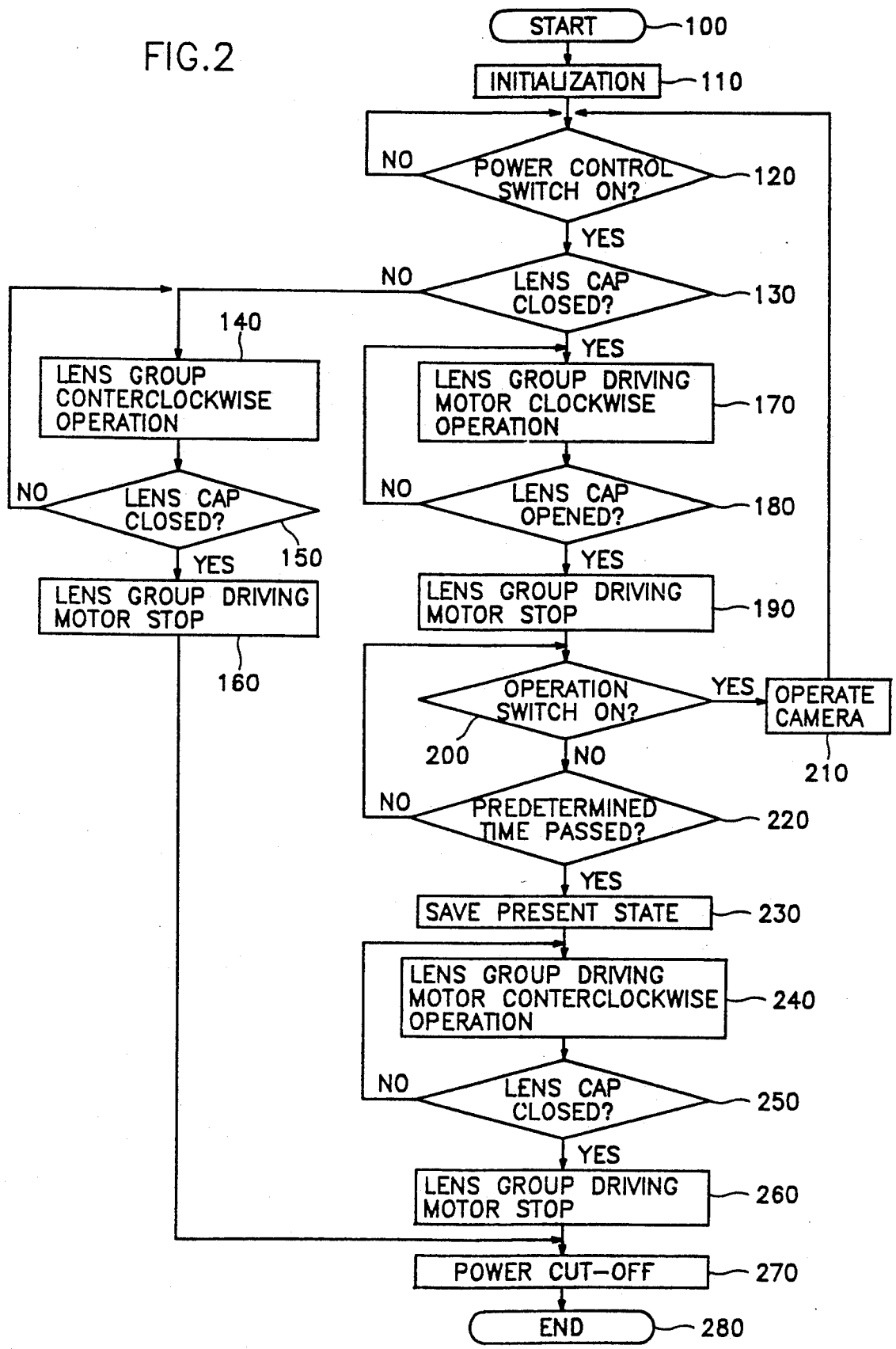

AUTO POWER CUT-OFF DEVICE FOR CAMERA AND DRIVING METHOD THEREFOR

BACKGROUND OF THE INVENTION

1. Field of the Invention

The present invention relates to an auto power cut-off device for a camera and driving method therefor. More particularly, this invention relates to an auto power cut-off device for a camera which can automatically close a lens cap and concurrently cut off power supplied to an auxiliary circuit in case that a user does not use a camera during a predetermined time after supplying the power to the camera.

2. Description of the Prior Art

In order to make operation easy, generally, middle class and low class cameras are made as automatic cameras with electronic circuits, such as an auto focus control means for automatically controlling the focus of a lens, an auto exposure control means for automatically controlling the exposure of film, an auto winding and rewinding driving means for automatically controlling the exposure of film, an auto winding and rewinding driving means for automatically controlling the transfer of the film, and an auto flash driving means for automatically compensating for a lack of sufficient light.

In such automatic cameras, power should be supplied to the auxiliary electronic circuits when a user wants to take a photograph.

However, in the above-mentioned prior art automatic cameras, the power consumption of the automatic camera is increased, since power is continuously supplied to the auxiliary circuits for controlling the operation of the automatic camera.

Hence, there is an inconvenience in case the user does not use the automatic camera in that the user draws a power source, such as a battery, so that the power is wasted.

SUMMARY OF THE INVENTION

Accordingly, it is an object of the invention to provide an automatic power cut-off device for a camera which automatically close a lens cap and concurrently cuts off power to an auxiliary circuit in case that a user does not use a camera during a predetermined time after supplying the power to the camera.

It is another object of the invention is conserve the power used for operating the auxiliary circuits of an automatic camera.

It is another object of the invention to prolong the useful life of a bettery for an automatic camera.

Briefly, the invention provides an auto power cut-off device for a camera comprising a switch block including a power control switch for turning ON to start the operation of the automatic camera, an encoder switch for varying ON/OFF state of the camera according to the state of the automatic camera 1680× and operation switch for controlling the operation of the camera. The power cut-off device also includes a micro controller for outputting a signal to cut off the power supplied to auxiliary circuits of the camera while closing a lens cap of the camera in case that the automatic camera is not used during a predetermined period after the operation of the automatic camera begins. The power cut-off device also includes a power control means for blocking the power supplied to the auxiliary circuits in case that the power cut-off signal is inputted from the micro controller.

The auto power cut-off device controls the power supplied to the auxiliary circuits, such as a motor driving means connected to the micro controller and the power control means, a shutter driving means, a distance measuring block, a flash driving means, and so on.

The driving method for the auto power cut-off device comprises the steps of initializing all the variables and auxiliary circuits after a power voltage is applied to start operation; reading whether a lens cap is closed in case that the power control switch is turned ON by reading whether the power control switch is turned ON; reading whether the lens cap is closed by rotating a lens group driving motor in a reverse direction in case that the lens cap is not closed; cutting off the power supplied to auxiliary circuits after suspending the operation of the lens group driving motor in case that the lens cap is closed by rotating the lens group driving motor in the reverse direction; reading whether the lens cap can be opened by rotating the lens group driving motor in a forward direction in case that the lens cap is closed after the power control means is turned ON; reading whether an operation switch is turned ON after suspending the operation of the lens group driving motor in case that the lens cap is opened by rotating the lens group driving motor in the forward direction; controlling the operation of the camera in case that the operation switch is turned ON; saving the present state of the automatic camera after a predetermined time passes by reading whether a predetermined time elapses in case that the operation switch can not be turned ON; suspending the operation of the lens group driving motor in case that the lens cap is closed after reading whether the lens cap is closed by rotating the lens group driving motor in the reverse direction; cutting off the power supplied to the auxiliary circuits after the operation of the lens group driving motor is suspended; and terminating all the operations.

BRIEF DESCRIPTION OF THE DRAWINGS

These and other objects of the invention will become more apparent from the following description of a preferred embodiment of the best mode of carrying out the invention when taken in conjunction with the following drawings, wherein:

FIG. 2 illustrating a flow diagram of the successive steps in an operation illustrating a driving method for auto power cut-off device for a camera according to the invention.

DESCRIPTION OF THE PREFERRED EMBODIMENTS

Figure 1:
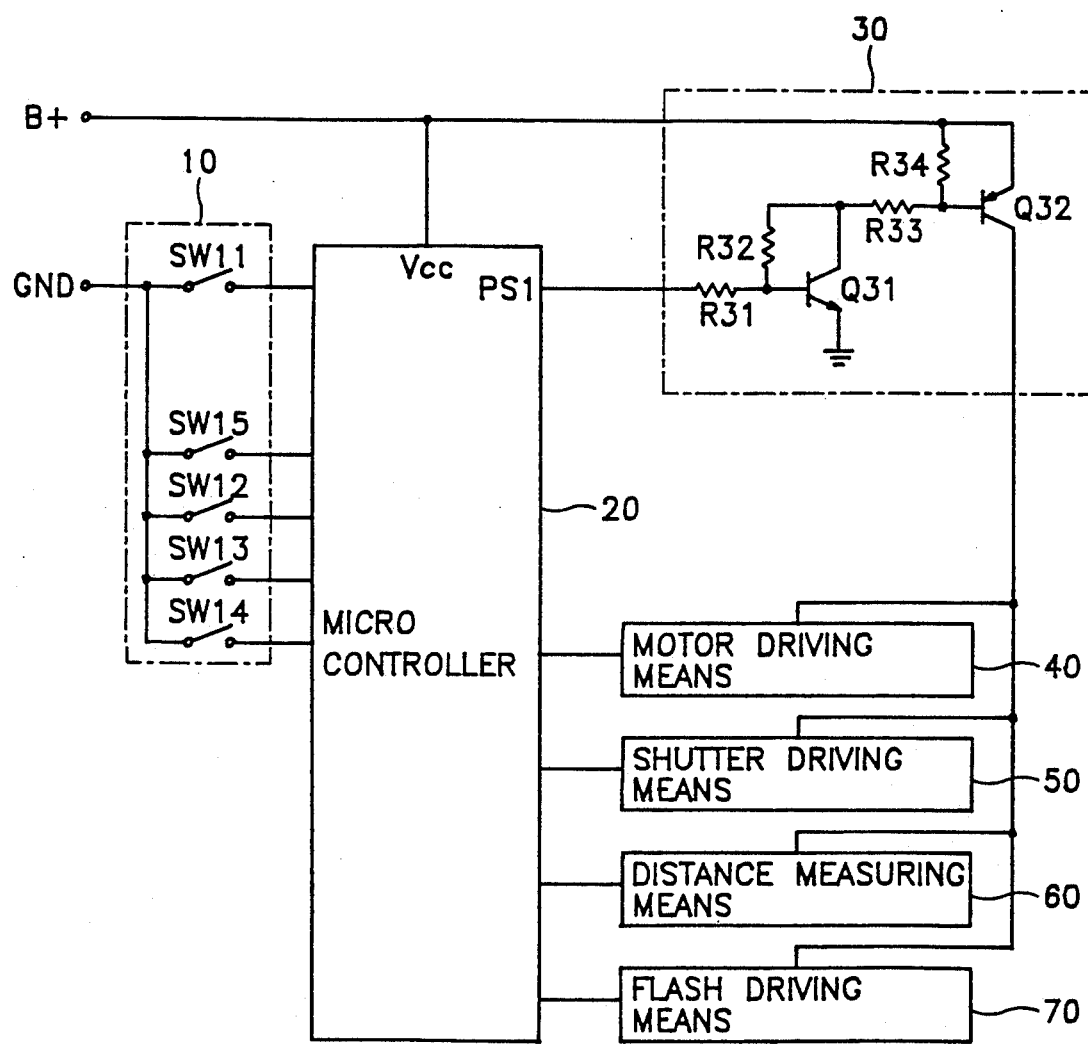
FIG. 1 is a circuit diagram of an auto power cutoff device for automatic camera according to the embodiment of the present invention.

As shown in FIG. 1, an auto power cut-off device for a camera (not shown) comprises a switch block 10 with an input stage connected to ground GND; a micro controller 20 with an input stage connected to an output stage of the switch block 10 and with a power input terminal VCC connected to a power voltage signal line B+; and a power supplying control means 30 with an input stage connected to a power supplying signal output stage PS1 of the micro controller 20 and the power voltage signal line B+. Further, the output stage of the micro controller 20 and the output stage of the power supplying control means 30 are connected to auxiliary circuits for each stage of a motor driving means 40, a shutter driving means 50, a distance measuring means 60 and a flash driving means 70.

The switch block 10 comprises a power control switch SW11 and all the other switches (not shown) including encoder switches SW12-SW14 used for sensing the operation state of an automatic camera, and an operating switch for operating the automatic camera.

The power supplying control means 30 comprises: a first resistance R31 with one terminal connected to the power supplying signal output terminal PS1 of the micro controller 20; a transistor Q31 with a base connected to the other terminal of the first resistance R31 and with an emitter connected to ground; a second resistance R32 connected between a collector and a base of the transistor Q31; a third resistance R33 with one terminal connected to the collector of the transistor Q31; a PNP type transistor Q32 with a base connected to the other terminal of the third resistance R33 and with the emitter connected to the power voltage signal line B+; and a fourth resistance R34 connected between the emitter and the base of the PNP type transistor Q32.

FIG. 2 illustrates the successive steps in the operation of the auto power cut-off device.

As shown in FIG. 2, a driving method comprises a step 100 of starting an operation if power voltage is applied; a step 110 of initializing all the variables and auxiliary circuits; a step 120 of reading whether a power control switch is turned ON; and a step 130 of reading whether a lens cap is closed in case that the power control switch SW11 is turned ON. The method further comprises a step 140 of rotating a lens group driving motor in a reverse direction in case that the lens cap is not closed; a step 150 of reading whether the lens cap is closed by rotating the lens group driving motor in the reverse direction; and a step 160 of cutting off the power supplied to the auxiliary circuits after suspending the operation of the lens group driving motor in case that the lens cap is closed by rotating the lens group driving motor in the reverse direction.

The method further r includes a step 170 of rotating the lens group driving motor in a forward direction in case that the lens cap is closed; a step 180 of reading whether the lens cap is opened by rotating the lens group driving motor in the forward direction; a step 190 of suspending the operation of the lens group driving motor in case that the lens cap is opened by rotating the lens group driving motor in the forward direction; a step 200 of reading whether an operation switch is turned ON; a step 210 of the operating the camera in case that the operation switch is turned ON.

The method further comprises a step 220 of reading whether a predetermined time elapses in case that the operation switch is not turned ON; a step 230 of saving the present state of the automatic camera in case that the predetermined time passes; a step 240 of rotating the lens group driving motor in the reverse direction; a step 240 of rotating the lens group driving motor in the reverse direction; a step 250 of reading whether the lens cap is closed by rotating the lens group driving motor counterclockwise; and a step 260 of suspending the operation of the lens group driving motor in case that the lens cap is closed by rotating the lens group driving motor in the reverse direction.

The method also includes a step 270 of cutting off the power supplied to the auxiliary circuits after the operation of the lens group driving motor is suspended; and a step 280 of terminating all the operations.

The operation of the auto power cut-off device for the an automatic camera is as follows.

If power voltage B+ is applied, the auto power cut-off device operates. Thereafter, the micro controller 20 initializes the auxiliary circuits by outputting a reset signal to the auxiliary circuits after initializing all the variables stored at an internal memory.

A power supplying signal PS1 of high state is outputted from the micro controller 20 to the power supplying control means 30, so that the power voltage B+ is applied to the auxiliary circuits like the motor driving means 40, the shutter driving means 50, the distance measuring means 60, the flash driving means 70, and the like through the PNP type transistor Q32 of the power supplying control means 30.

Next, the micro controller 20 reads whether a signal of low state is inputted from the power control switch SW11 of the switch block 10, and detects whether the power control switch SW11 is turned ON.

The power control switch SW11 is a switch whose operation can be started by being turned ON in case that the user intends to take a photograph using the automatic camera.

If the power control switch SW11 is turned ON, the micro controller 20 outputs the power supplying signal PS1 of high state to the power supplying control means 30, so that the power voltage B+ is applied to the auxiliary circuits like the motor driving means 40, the shutter driving means 50, the distance measuring means 60, the flash driving means 70 and the like through the PNP type transistor Q32 of the power supplying control means 30.

Concurrently, the micro controller 20 reads the state of encoder switches SW12-SW14 of the switch block 10, and detects whether the lens cap is closed.

The encoder switches SW12-SW14 are the switches which indicate the state of the camera like the following <Table - 1>.

TABLE 1

| state | SW12 | SW13 | SW14 |
|---|---|---|---|
| close state | OFF | OFF | OFF |
| gap state (middle state) | OFF | OFF | ON |
| wide mode | ON | OFF | ON |
| zum first step mode | ON | OFF | OFF |
| zum second step mode | ON | ON | OFF |
| zum third step mode | ON | ON | ON |
| zum fourth step mode | OFF | ON | ON |
| tele mode | OFF | ON | OFF |

(ON = switch is in ON state, OFF = switch is in OFF state)

If the encoder switches SW12-SW14 are in the close state, the micro controller 20 reads that the lens cap is closed, and if the encoder switches SW12-SW14 are in the gap state, the micro controller 20 reads that the lens cap is opened.

In case that the lens cap is not closed according to the state of the encoder switches SW12-SW14 after the power control switch SW11 of the switch block 10 is turned ON, the micro controller 20 makes the lens group driving motor rotate in the reverse direction by controlling the motor driving means 40.

If the lens group driving motor rotates in the reverse direction, a body tube (not shown) of the lens group comes inside the automatic camera, and at the same time, the lens cap is closed. If the lens cap is closed, the lens is protected against being blurred or damaged by a foreign substance.

At this point, the micro controller 20 reads the state of the encoder switches SW12-SW14 and determines whether the lens cap is closed completely. In case the lens cap is completely closed, that is, the encoder switches SW12-SW14 are in the state of closed, the micro controller 20 stops the operation of the lens group driving motor by controlling the motor driving means 40.

Next, the micro controller 20 prevent the power voltage B+ from being applied through the PNP type transistor Q32 of the power supplying control means 30 to the auxiliary circuits i.e. the motor driving means 40, the shutter driving means 50, the distance measuring means 60, the flash driving means 70 and the like by outputting the power supplying signal PS1 to the power supplying control means 30.

If the power supplying signal PS1 of the low state is applied from the micro controller 20 to the base terminal of the transistor Q31 of the power supplying control means 30, the transistor Q31 is turned OFF. If the transistor Q31 is turned OFF, the signal of the high state is inputted to the base terminal of the PNP type transistor Q32, and so, the PNP type transistor Q32 is turned OFF. Accordingly, the power voltage B+ applied to the motor driving means 40, the shutter driving means 50, the distance measuring means 60, the flash driving means 70 and the like is cut off.

However, in case that the lens cap is closed according to the state of the encoder switches SW12-SW14 after the power control switch SW11 of the switch block 10 is turned ON, the micro controller 20 makes the lens group driving motor rotate in the forward direction by controlling the motor driving means 40.

If the lens group driving motor rotates in the forward direction, the body tube (not shown) of the lens group moves outward and, at the same time, the lens cap is opened.

At this time, the micro controller 20 reads the state of the encoder switches SW12-SW14 and determines whether the lens cap is completely opened. In case the lens cap is completely opened, that is, the encoder switches SW12-SW14 are in the state of "gap", the micro controller 20 stops the operation of the lens group driving motor by controlling the motor driving means 40.

Next, the micro controller 20 inspects continually whether the signal is inputted from the switch block 10.

If the signal from the operation switch of the switch block 10 is then inputted, the micro controller 20 carries out the photographing operation by driving the auxiliary circuits related to this signal.

However, if the signal is not inputted from the switch block 10 within a predetermined time, the micro controller 20 stores the present sate of the automatic camera at an internal memory, and rotates the lens group driving motor in the reverse direction by controlling the motor driving means 40.

If the lens group driving motor rotates in the reverse direction, a body tube (not shown) of the lens group moves inside the automatic camera and, at the same time, the lens cap is closed.

At this point, the micro controller 20 reads the state of the encoder switches SW12-SW14 and determines whether the lens cap is closed completely. In case the lens cap is completely closed, the micro controller 20 stops the operation of the lens group driving motor by controlling the motor driving means 40.

Next, the micro controller 20 prevent the power voltage B+ from being applied through the PNP type transistor Q32 of the power supplying control means 30 to the auxiliary circuits like the motor driving means 40, the shutter driving means 50, the distance measuring means 60, the flash driving means 70 and the like by outputting the power supplying signal PS1 to the power supplying control means 30.

Accordingly, in case the user does not use the automatic camera for the predetermined time after turning ON the power control switch SW11 of the switch block 10, the micro controller 20 blocks the supply of the power voltage B+ to the auxiliary circuits such as the motor driving means 40, the shutter driving means 50, the distance measuring means 60, the flash driving means 70, and the like, so as to prevent the power from being wasted vainly by the auxiliary circuits.

The invention thus provides an auto power cut-off device for an automatic camera and a driving method therefor which can automatically close a lens cap, and concurrently cut off power supplied to an auxiliary circuit in case a user does not use a camera during a predetermined time after supplying the power to the camera, and so greatly reduce the power consumption.

What is claimed is:

1. A driving method for an auto power cut-off device for an automatic camera comprising the steps of:

initializing all the variables and auxiliary circuits of the camera after power voltage is applied to start operation;

reading whether a lens cap is closed in case to turning on of a power control switch;

reading whether the lens cap is closed by rotating a lens group driving motor in a reverse direction in case the lens cap was not closed;

cutting off the power supplied to auxiliary circuits after suspending the operation of the lens group driving motor in case that the lens cap is closed by rotating the lens group driving motor in the reverse direction;

reading whether the lens cap can be opened by rotating the lens group driving motor in a forward direction in case that the lens cap is closed after the power control means is turned ON;

reading whether an operation switch is turned ON after suspending the operation of the lens group driving motor in case that the lens cap is opened by rotating the lens group driving motor in the forward direction;

operation the camera in case that the operation switch is turn ON;

saving the present state of the camera after a predetermined time passes in case that the operation switch has not been turned ON;

suspending the operation of the lens group driving motor in case that the lens cap is closed after reading whether the lens cap is closed by rotating the lens group driving motor in the reverse direction;

cutting off the power supplied to the auxiliary circuits after the operation of the lens group driving motor is suspended; and terminating all the operations.

2. Auto power cut-off device for an automatic camera comprising a switch block including a power control switch for turning ON to start the operation of the automatic camera, an least one encoder switch indicating an ON/OFF state of the automatic camera, and an operation switch for controlling the operation of the camera;

a micro controller for outputting a cut-off signal to cut off the power supplied to auxiliary circuits of the camera in response to none-use of the automatic camera a predetermined period after the operation of the automatic camera begins; and a power supplying control means for blocking the power supplied from a power voltage signal line to the auxiliary circuits in response to said power cut-off signal being inputted from said micro controller, said control means including a first resistance with one terminal connected to a power supplying signal output terminal of said micro controller;

a transistor with a base connected to another terminal of said first resistance and with an emitter connected to ground;

a second resistance connected between a collector and said base of said transistor;

a third resistance with one terminal connected to said collector of said transistor;

a PNP type transistor with a base connected to another terminal of said third resistance and with an emitter connected to the power voltage signal line; and a fourth resistance connected between an emitter and said base of said PNP type transistor.

* * * * *

UNITED STATES PATENT AND TRADEMARK OFFICE
CERTIFICATE OF CORRECTION

PATENT NO. : 5,309,195

DATED : May 3, 1994

INVENTOR(S) : BONJEONG GOO, et al

It is certified that error appears in the above-identified patent and that said Letters Patent is hereby corrected as shown below:

In the abstract, line 16 change "beings" to --begins--

Column 1, line 53 change "bettery" to --battery--

Line 59 change "1680 X and" to --an--

Column 3, line 43 cancel "r"

Lines 58 to 59 cancel "a step 240...reverse direction;"

Column 7, line 7 change "none" to --non--

Signed and Sealed this

Thirtieth Day of August, 1994

*Attest:*

BRUCE LEHMAN

*Attesting Officer*     *Commissioner of Patents and Trademarks*